United States Patent [19]
Skaar et al.

[11] Patent Number: 5,746,649
[45] Date of Patent: May 5, 1998

[54] DESINEWING OF BONELESS TRIM

[75] Inventors: Gary R. Skaar, Marshall; Terry L. Holmes, DeForest; Donald E. Lucke, Madison; Gerald R. Popenhagen, Middleton; Jay I. Gust, Poynette; William N. G. Barron, III, Waunakee; Dean F. Schwarz, Lodi, all of Wis.

[73] Assignee: Kraft Foods, Inc., Northfield, Ill.

[21] Appl. No.: 740,135

[22] Filed: Oct. 22, 1996

Related U.S. Application Data

[63] Continuation of Ser. No. 675,175, Jul. 3, 1996.

[51] Int. Cl.⁶ .................................................. A22C 18/00
[52] U.S. Cl. .................................. 452/172; 452/144
[58] Field of Search ............................... 452/172, 141, 452/144

[56] References Cited

U.S. PATENT DOCUMENTS 4,086,683  5/1978  Davis et al. ........................... 452/144
4,359,807  11/1982  Adkison et al. ........................ 452/172
5,035,672  7/1991  Rocha et al. .......................... 452/144

Primary Examiner—Willis Little
Attorney, Agent, or Firm—Lockwood, Alex, Fitzgibbon & Cummings

[57] ABSTRACT

An assembly and method are disclosed for separating the muscle tissue of meat from sinew. A plurality of elongate pins which are spaced from each other in a direction perpendicular to the longitudinal axes of the pins pierce the meat from which the sinew is to be removed to restrain the sinew against movement, and a compressive force is imparted to the muscle tissue by a compression assembly while the sinew is being restrained against movement. The force which is imparted to the muscle tissue separates the muscle tissue from the sinew and causes the muscle tissue to move away from the restrained sinew and through the spaces between the pins. With the assembly and method of the invention it is possible to remove significant and substantial portions of the sinew from the meat being processed, and to reduce the fat in the muscle tissue to as little as less than 1–1½ wt %.

40 Claims, 10 Drawing Sheets

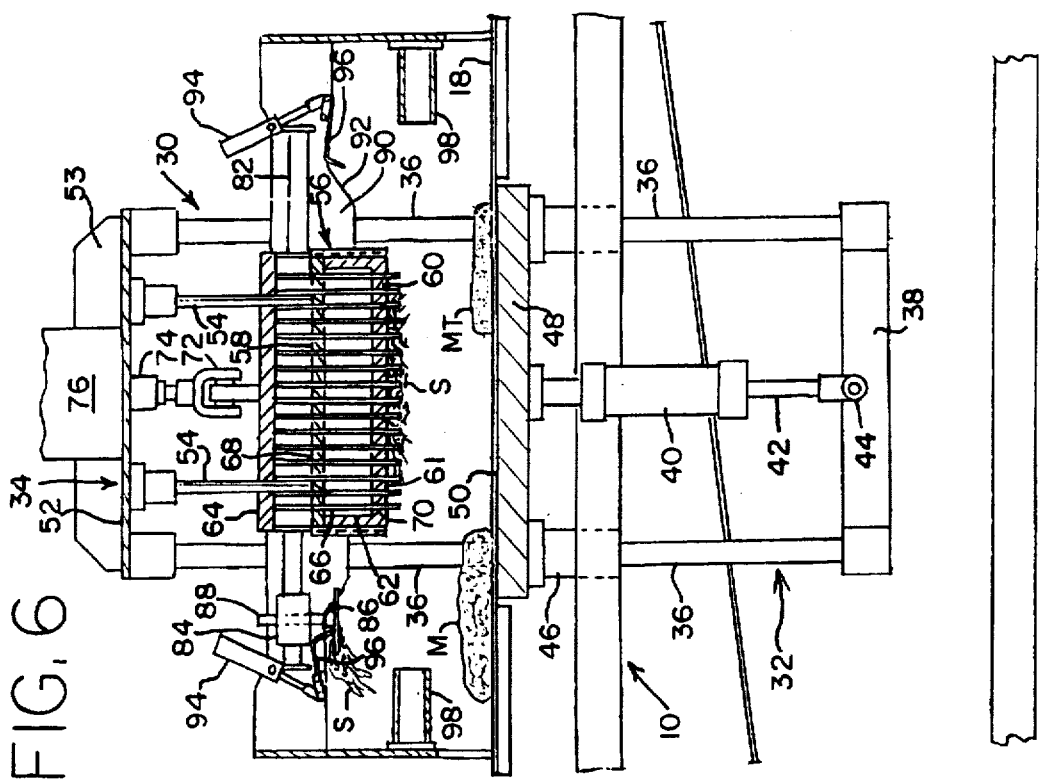
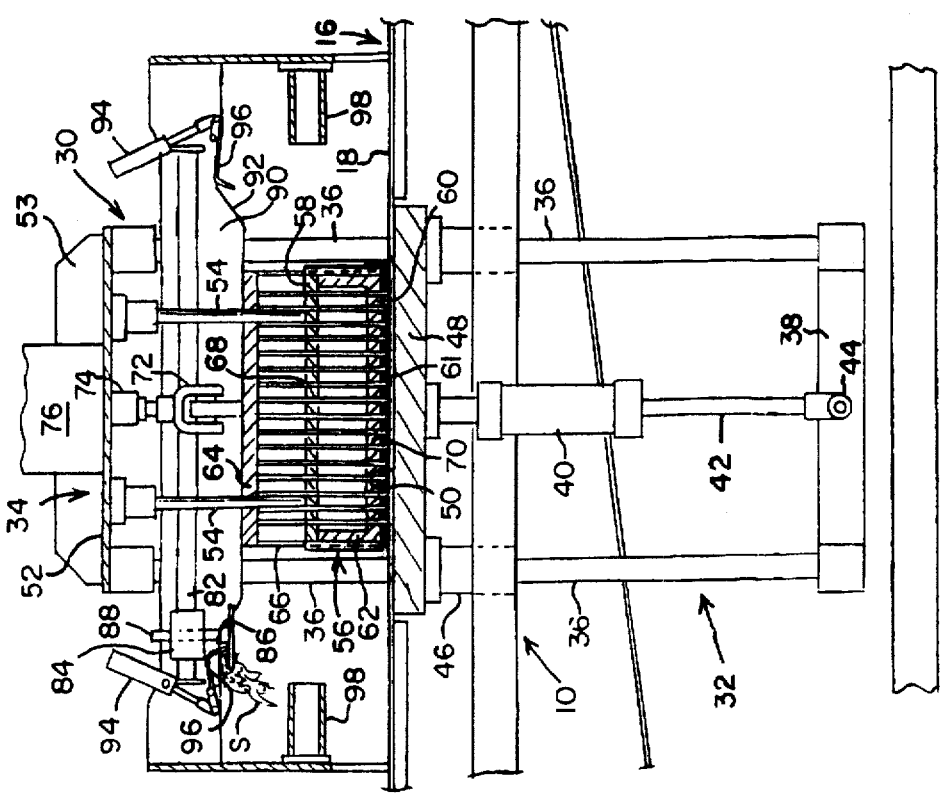

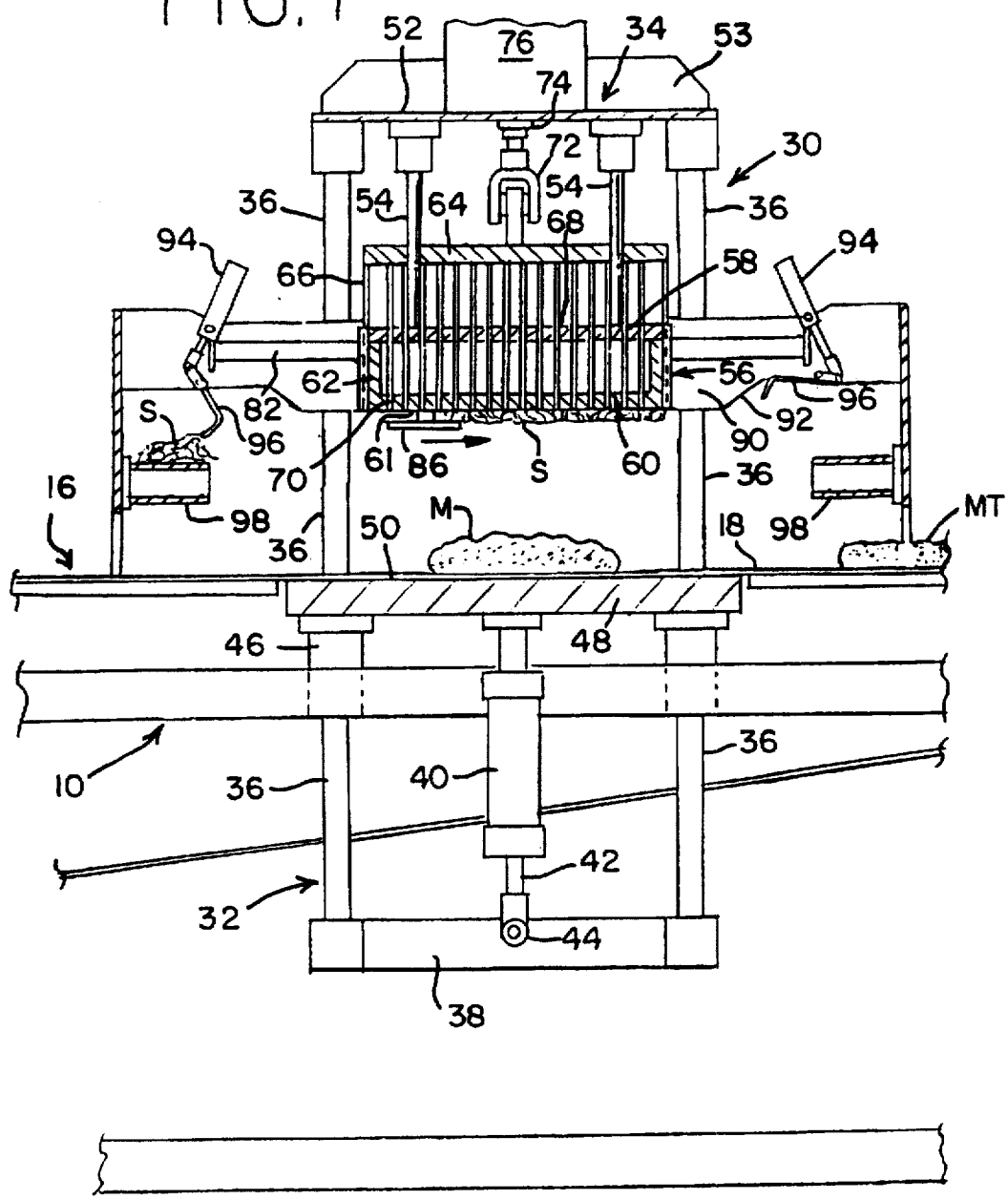

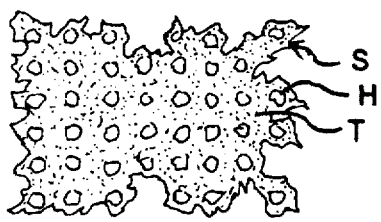
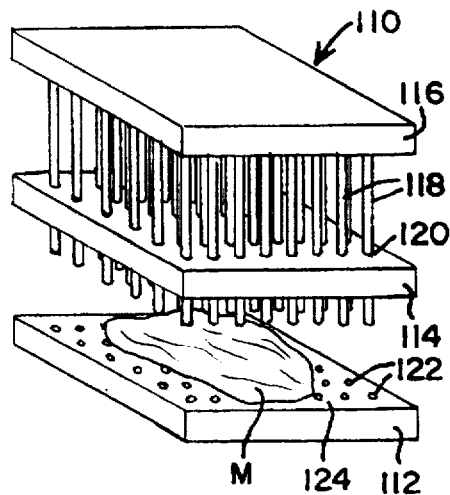
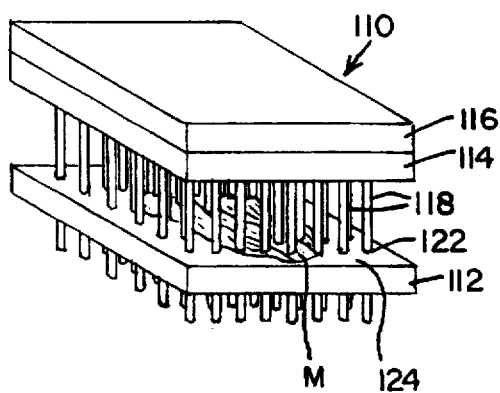
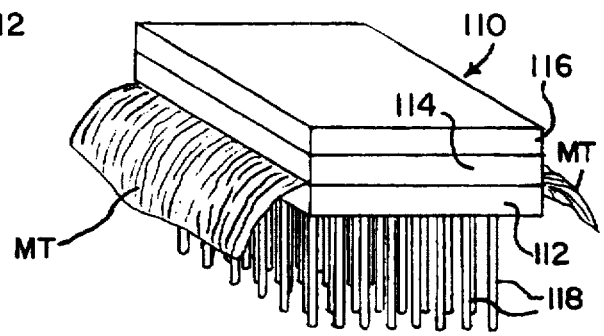
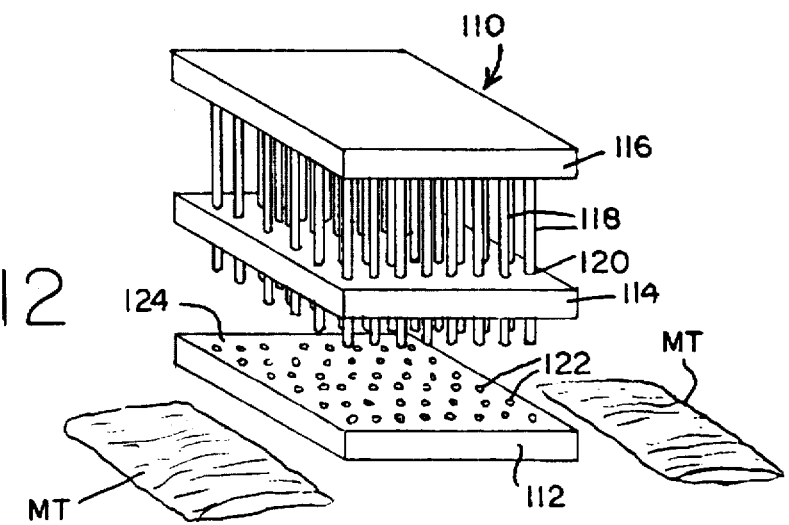

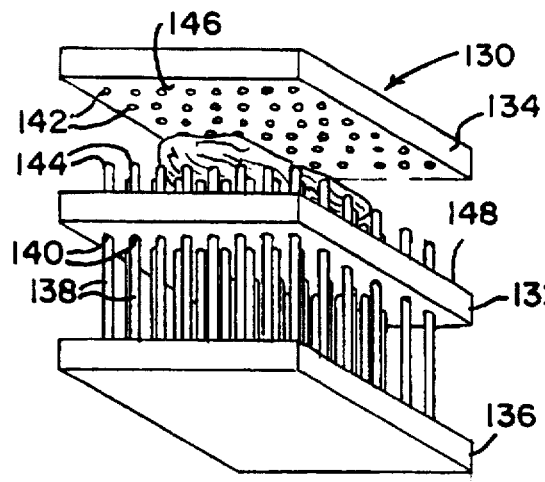
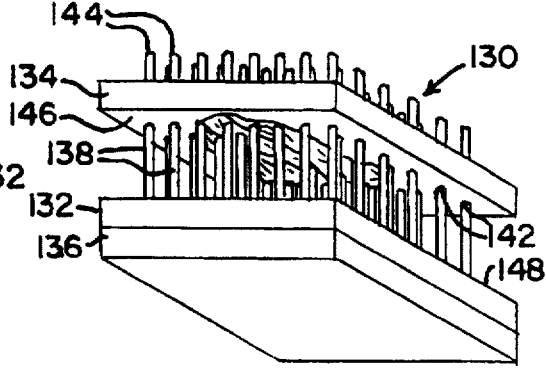
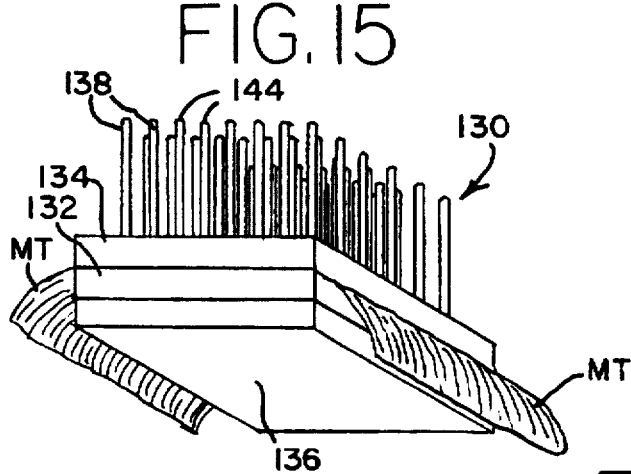
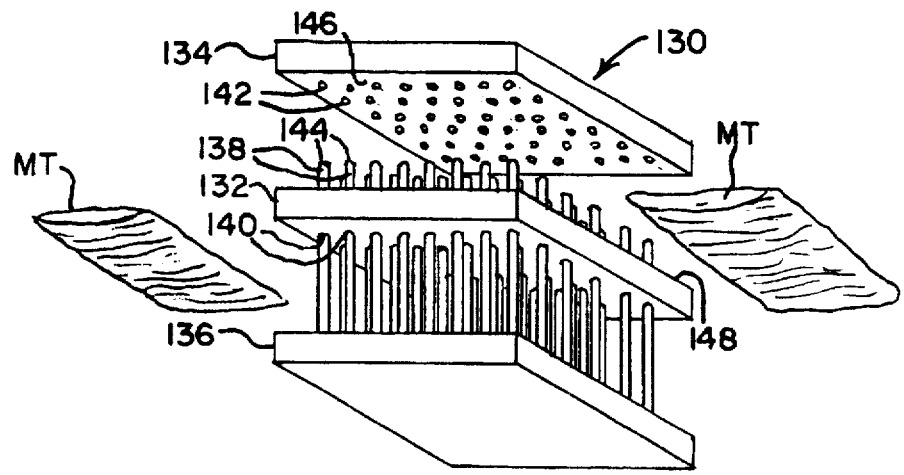

DESINEWING OF BONELESS TRIM

This application is a continuation of application Ser. No. 08/675,175, filed Jul. 3, 1995 pending.

BACKGROUND AND SUMMARY OF THE INVENTION

The present invention is directed to the desinewing of meats and, more specifically, to a method and apparatus for the separation of muscle tissue from the sinew of trimmed boneless cuts of meat and from the fat associated with and attached to the sinew.

As employed hereafter, the term "meat" refers to whole muscle trim of beef, pork or ham, turkey, chicken or other fowl or any other edible flesh products which are typically consumed by the human or other animal.

Such meats typically comprise several components which include the muscle tissue itself which is desired for consumption, and gristle and other connective tissue which may be generally categorized under the term "sinew". This sinew is generally intimately interwoven with the muscle tissue, and connects and holds the muscle tissue together. Such meats will also typically include varying amounts of fatty deposits or cells. These may exist in rather large distinct masses which are readily susceptible to removal by hand trimming. These fatty deposits may also consist of relatively small cells of fat which are interspersed throughout in the muscle tissue and which are associated with and attached to the sinew which is intimately interspersed throughout the meat. This latter category of fat is the typical marbling which for example is prevalent in beef muscle tissue. This interspersed fat is not typically susceptible to removal by hand trimming. Fatty cells are also associated with connective tissue membrane on the meat. These membranes and a large portion of the fat cells associated with them may be removed by the use of commercially available membrane skinners.

In the course of preparation of various cuts of meat for human consumption following slaughter, pieces or cuts of the whole muscle tissue of the meat are typically initially hand trimmed to remove bones and other obvious and distinct deposits of fat, gristle and the like. By such manual trimming, not only is difficult to chew gristle removed, but also the fat content can be substantially reduced by removal of large accessible visually distinct deposits of fat. Fat reduction can be also be further achieved by the skinning of the membrane and its associated fat cells. However, manual trimming and membrane skinning have limitations.

One limitation is that the level of fat content of the meat can only be reduced without undue effort and loss of desirable muscle tissue to certain minimums which are usually too high to meet the current government definitions for low fat and/or "fat free". For example, the United States Nutritional Labelling and Education Act (NLEA) regulations require that for a non-entree meat to be labelled as "fat free", it must have less than 0.5 gram of fat per serving and reference amount, which is 55 grams for a sliced meat. This translates to a definition of "fat free" being equal to or less than 0.91 percent by weight of fat in a non-entree meat product.

Another limitation of manual trimming is that the sinew which is intimately interwoven through the muscle tissue cannot be removed in any significant portion and, thus, the sinew and the fat which is typically associated with and attached to it remains in the meat and must be consumed by the consumer. This sinew also makes the meat tougher to chew and, depending upon the particular cut of meat, can result in a reduction in quality or grade of the meat to an extent that the value of the meat is substantially reduced, and in some cases may be so reduced that it must be relegated to non-human consumption, e.g. pet food.

Various procedures have been employed in the past for tenderizing sinew containing meats. These have generally involved either beating or pounding of the meat in order to break the sinew which is interwoven throughout the muscle tissue of the meat, or the repeated insertion and withdrawal of needles or blades into the meat in order to cut or break the sinew to tenderize the meat.

These tenderizing procedures have enjoyed some measure of success in the tenderizing of the meat. However, these procedures do not actually remove the sinew from the muscle tissue and, therefore, the sinew remained in the product together with its associated fat cells to be ultimately consumed along with the muscle tissue. Moreover, such intense mechanical treatment tended to undesirably alter the original physical nature of the muscle tissue including its texture.

Other tenderizing procedures in the past have also included the application of chemicals or enzymes to the meat. However, these also typically undesirably alter the appearance or texture of the muscle tissue.

Currently, awareness of fat intake has lead consumers to highly value food sources which are relatively low in fat or have virtually no fat content. Traditionally, many meat products, however, have been perceived by certain groups as being products that are relatively high in fat content, such as pork or ham. Accordingly, various procedures have also been employed in the past for reducing the fat content of meats to levels lower than might otherwise be readily achieved by manual or hand trimming. These have included heating of the meat to melt the fat and/or render the fat from the meat, grinding or comminuting of the meat to small particle sizes together with the fat cells in the meat, treating of the meat with selected additives or diluents to flush the fat from the meat, or the addition of various non-fat supplements to the meat to reduce the percentage of the preexisting fat relative to the total mass without actually removing the fat. These procedures have been employed singly or in some varying degrees of combination. Each has its disadvantages. Heating of the meat frequently results in some measure of denaturization of the meat which detracts from its fresh taste, feel and appearance. Grinding or comminution of the meat creates the quality and appearance of exactly that, a ground meat product, which is unacceptable in a considerable number of end uses particularly where whole muscle tissue is desired. The addition of diluents, additives or supplements also results in an alteration of the qualities of the initial fresh meat product which in many instances is undesirable in end use. Moreover, each of these fat removal or dilution procedures fails to remove the sinew from the meat and, therefore, the sinew remains with any disadvantages that may be attendant to the presence of sinew, e.g. toughness and chewiness and/or the presence of fat cells associated with or attached to the sinew.

In contrast to these prior meat processing techniques, the present invention is directed to the desinewing of meats by physically and mechanically actually removing the sinew from the meat and its muscle tissue. In the present invention the removal of a significant and substantial portion of the sinew is possible. Thus, in the present invention the muscle tissue from which the sinew has been removed may be substantially upgraded and improved in quality and value because it is more tender for consumption. Thus, meat cuts which were of good quality before may be further improved by the present invention, and meat cuts which were of only marginal quality before may be substantially upgraded in quality and value by the present invention. Examples of meat cuts which are of good quality and in which the quality may be further improved by the practice of the present invention include knuckle muscle such as the Quadriceps femoris muscle, the Rectus femoris muscle and the Vastus lateralis muscle; leg muscles such as Semimembranosus and biceps femoris muscles; and butt muscle such as the Gluteus medius. Examples of other meat cuts which may be of only marginal quality but which may be substantially upgraded by the practice of the present invention include but are not limited to knuckle cap (Tensor fasciae latae); lower and upper shank (Flexur digitorum superficialis/profundus and gastrocnemius); tenderloin (Psoas major, Iliacus and Sartorius); portions of the outside muscle (Semitendinosus, Gluteus superficialis, biceps femoris and Gluteobiceps), and top butt (Gluteus accessorius and Gluteus profundus).

Another distinct advantage of the present invention is that the muscle tissue can be separated from the sinew without grinding or comminution of the meat, without heating and without the need to add chemicals, enzymes, diluents, additives or supplements. Thus, the muscle tissue which has been removed from the sinew in the present invention still maintains essentially all of its original, highly desired whole muscle qualities of texture, color and appearance similar to that of fresh uncooked, unground and otherwise unprocessed whole muscle tissue.

Another advantage of the present invention is that upon removal of the sinew from the muscle tissue much of the fat and fat cells associated with or attached to the sinew will also be removed with the sinew. Accordingly, muscle tissue of even pork and ham, meats from which it is typically more difficult to remove or reduce the fat content, may be substantially reduced in fat to highly desirable fat levels of less than about 2 wt %, and in many instances to less than about 1–1½ wt % fat content. This is a significant advantage in the current market in which the consumption of saturated fats is discouraged for health reasons so that most consumers are highly conscious of fat content. Moreover, these extremely low reduced fat levels will satisfy the current government definitions to permit the meat products of the invention to be marketed as "low fat" or "fat free" products.

In one principal aspect of the present invention, a method of and assembly for separating muscle tissue of meat from the sinew include restraining the sinew against movement relative to a surface and imparting a compressive force to the muscle tissue in a direction toward the surface while restraining the sinew. The force is sufficient to separate the muscle tissue from the sinew and cause the muscle tissue to move away from the restrained sinew in a direction at a substantial angle to the direction in which the compressive force is imparted to the muscle tissue.

In another principal aspect of the present invention, the sinew is restrained by piercing the meat.

In still another principal aspect of the present invention, the sinew is restrained by a plurality of elongate pins which are spaced from each other in a direction substantially perpendicular to the longitudinal axes of the pins.

In still another principal aspect of the present invention, the muscle tissue which moves away from the restrained sinew moves through the spaces between the pins.

In still another principal aspect of the present invention, the meat from which the sinew is to be separated is positioned between a pair of surfaces and the surfaces are brought together with the meat therebetween to impart the compressive force to the meat to separate the muscle tissue from the sinew while the sinew is restrained and cause the muscle tissue to move in a direction substantially parallel to at least one of those surfaces.

In still another principal aspect of the present invention, the sinew is restrained by the aforementioned elongate pins which extend between the surfaces when restraining the sinew.

In still another principal aspect of the present invention, the pins have blunt ends which pierce the meat and bear against one of the surfaces to restrain the sinew, and the other surface is moved along the pins and toward the blunt ends to impart the compressive force to the muscle tissue.

In still another principal aspect of the present invention, a force is imparted to the pins which is of a magnitude sufficient to restrain the sinew, and the compressive force is greater than the force which is imparted to the pins.

In still another principal aspect of the present invention, the pins may extend through either one or both of the surfaces when the compressive force is imparted to the muscle tissue.

In still another principal aspect of the present invention, the sinew which has been restrained is restrained against one of the surfaces, and is scraped from the surface after it has been separated from the muscle tissue.

In still another principal aspect of the present invention, a substantial amount of fat associated with the sinew is also removed from the meat by restraining the fat with the sinew with which it is associated while the compressive force is imparted to the muscle tissue to separate the muscle tissue from both the sinew and the fat associated with the sinew.

In still another principal aspect of the present invention, the amount of fat in the muscle tissue may be reduced to about 2 wt % or less and, more preferably, to less than about 1–1½ wt %.

In still another principal aspect of the present invention, one of the surfaces includes a conveyor for moving the meat from the which the sinew is to be removed between the surfaces.

In still another principal aspect of the present invention, an assembly for separating sinew from the muscle tissue of meat includes first and second surfaces spaced from each other to receive the meat therebetween from which the sinew is to be removed, and a plurality of elongate pins spaced from each other and movably extendable from the first surface toward the second surface to restrain the sinew, and the pins are also movable through the first surface. First drive means imparts a force to the pins to move their ends toward the second surface for restraining the sinew in the meat from which the sinew is to be removed and which has been positioned between the surfaces. Second drive means moves at least one of the surfaces toward the other to impart a substantial compressive force to the muscle tissue of the meat sufficient to cause the muscle tissue to separate from the sinew and move away from the sinew through the spaces between the pins while the sinew is restrained by the pins.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIGS. 3–7 are partially broken cross-sectioned side elevation views of the desinewing portion of the assembly substantially as shown in FIGS. 1 and 2, and showing the positioning and operation of the several component parts of the desinewing unit of the assembly of the invention during various chronological incremental steps in the desinewing method;

FIG. 8 is a plan view sketch of a typical web of sinew following separation and removal from the muscle tissue of the meat in accordance with the present invention;

FIGS. 9–12 schematically depict a second embodiment of the invention and its operation, and in which the pins for restraining the sinew move downwardly and through the surface against which the meat is compressed;

FIGS. 13–16 schematically depict a third embodiment of the invention and its operation similar to the last mentioned second embodiment, but in which the pins move upwardly through the surface against which the meat is compressed;

DETAILED DESCRIPTION OF THE PREFERRED EMBODIMENTS

Figure 1:
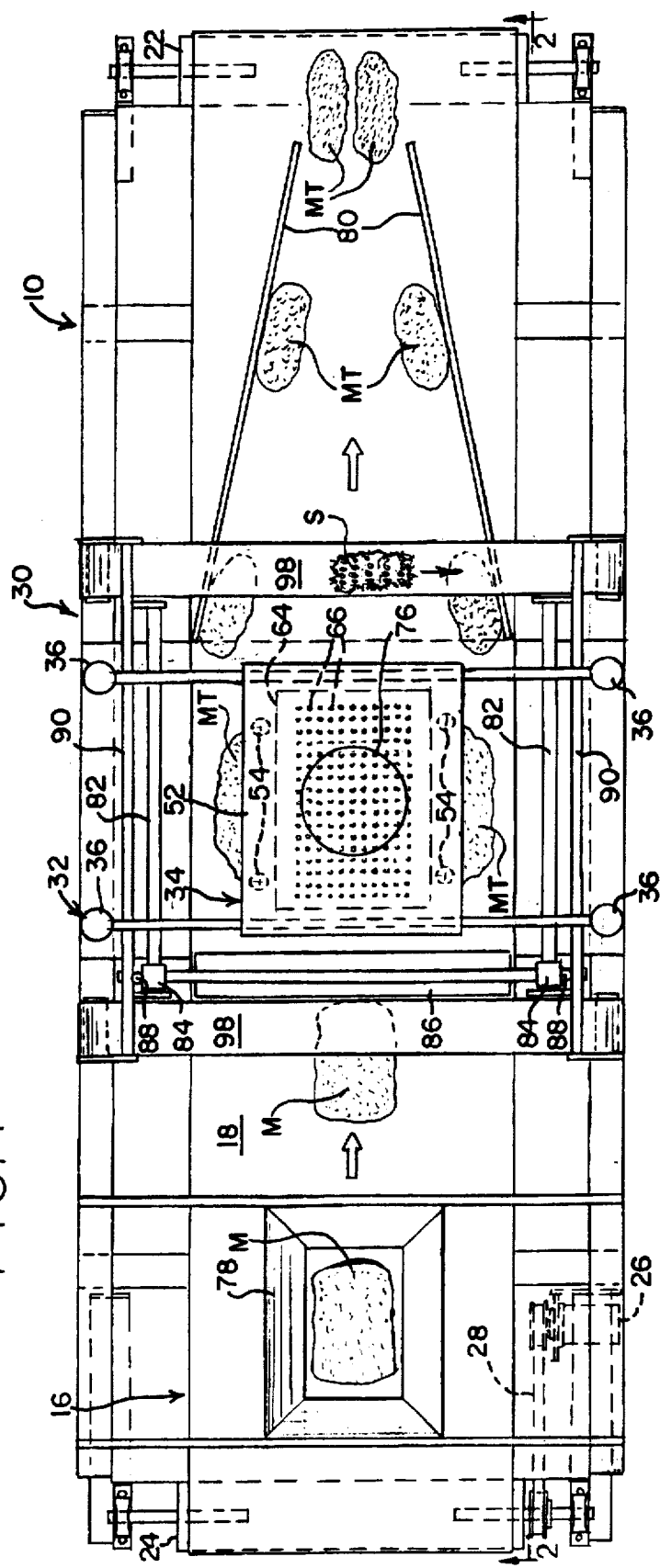
FIG. 1 is a plan view of an assembly for desinewing and for practicing the method of separation of sinew from the muscle tissue of meat in accordance with the principles of the present invention.
Figure 2:
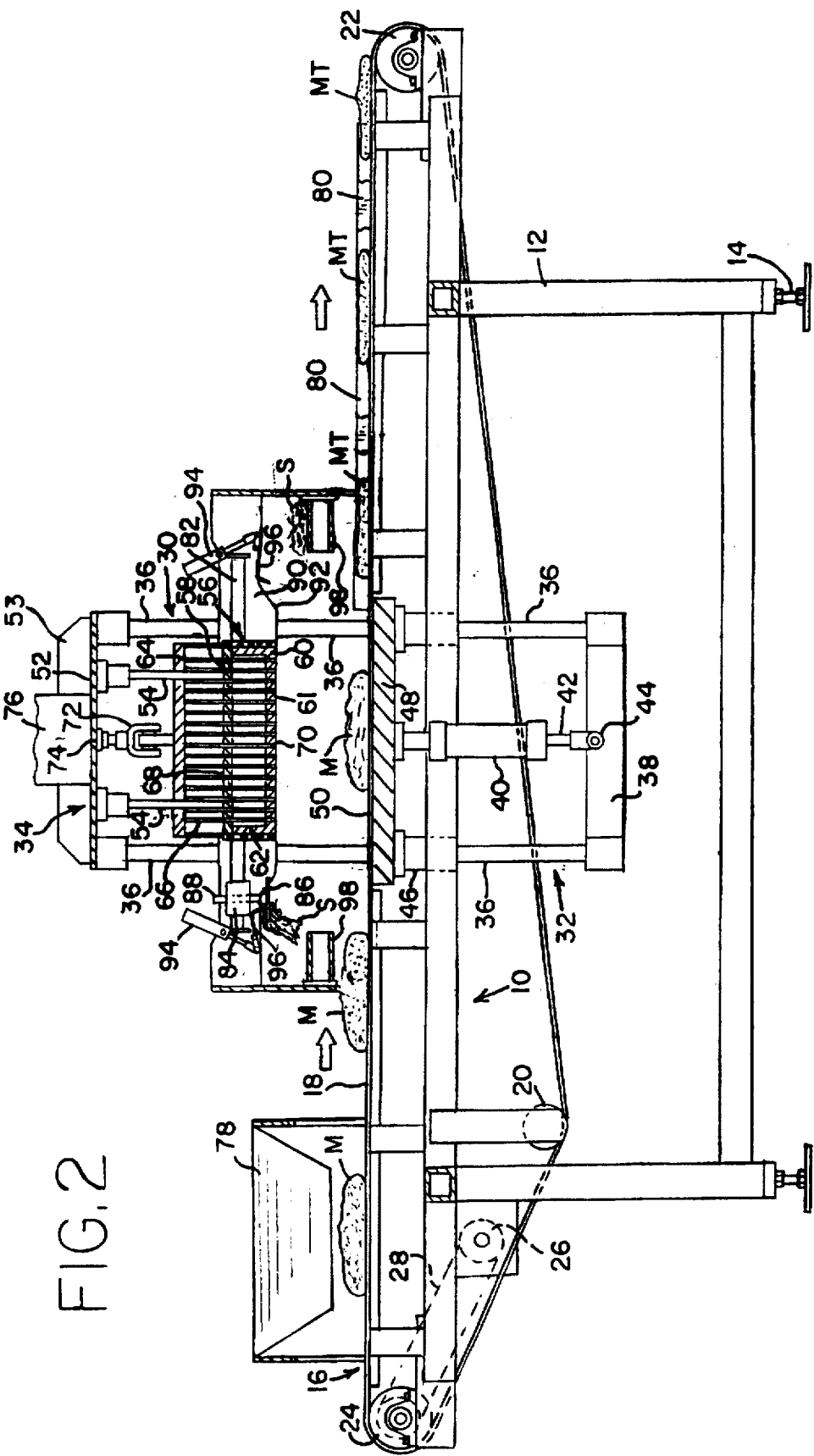
FIG. 2 is a partially broken, cross-sectioned side elevation view of the assembly substantially as shown in FIG. 1 and as viewed substantially along line 2—2 of FIG. 1.

One preferred embodiment of the present invention is shown in FIGS. 1 and 2, and the detail of the operation of that preferred embodiment of the assembly and method of the invention are shown sequentially in FIGS. 2–7.

Referring to FIGS. 1 and 2, the assembly includes a frame 10 supported upon a plurality of legs 12. One or more of the legs 12 preferably include leveling feet 14 at the bottom to permit leveling of the assembly and to make certain that the assembly is firmly and stationarily supported upon the floor or other surface upon which it is to operate. It will be appreciated that firm rigid support of the assembly is desirable upon considering the operation of the assembly and the substantial forces and movements which occur in various of its components during its operation.

A conveyor 16 is positioned at the top of the frame 10. The conveyor 16 preferably comprises an endless conveyor belt 18, which is preferably formed of a hard, flexible strong polymer which is food compatible and which is capable of withstanding the substantial forces and wear to which it will be exposed. Such polymers may include polyethylene and the like. The conveyor belt 18 is trained around one or more idler rollers 20 and 22 as best seen in FIG. 2 and also around a powered drive roller 24. The drive roller 24 may be driven by a suitable motor 26 via either a pulley and belt drive or chain and sprocket drive 28. It will be appreciated that the location of the idler roller 22 and drive roller 24 may be reversed from that shown in the drawing without departing from the principles of the invention.

The principal feature of the desinewing assembly shown in FIGS. 1–7 is the desinewing unit 30 of the assembly. In general the desinewing unit 30 comprises two movable, force imparting subassemblies, a lift assembly generally 32 and a head assembly generally 34.

The lift assembly 32 preferably comprises at least four spaced, vertical lift posts 36 which extend through, above and beneath the plane of the upper surface of the conveyor belt 18, as best seen in FIGS. 2–7, and which straddle the conveyor belt, as best seen in FIG. 1. A strong, rigid frame 38 is fixed at its corners to the bottom of each of the lift posts 36. A suitable drive means, such as a reciprocating hydraulic cylinder 40, is stationarily fixed at one end to the frame 10, and its piston rod 42 which extends from the other end of the cylinder 40 is coupled by a suitable coupling 44 to the frame 38. Preferably this piston rod coupling 44 permits some degree of pivotal or rotational motion to compensate for variations in alignment between the piston rod 42, the frame 38 and the spaced posts 36 during their movement and operation.

In the embodiment shown in FIGS. 1–7, the lift posts 36 are reciprocated up and down by the hydraulic cylinder 40 and frame 38. As the lift posts 36 reciprocate through the plane of the upper flight of the conveyor belt 18, they are preferably guided by journals 46 which are mounted to a substantially flat, heavy gauge rigid base plate 48. The base plate 48 is of heavy and substantial construction so that it is capable of readily withstanding the forces to be applied to it during the desinewing operation, as will be later described. The base plate 48 presents an upper surface 50 upon which the conveyor belt 18 slides and is supported during the desinewing operation. Also in the embodiment shown in FIGS. 1–7, the upper end of the hydraulic cylinder 40 is shown as mounted to the underside of the base plate 48.

The upper ends of the lift posts 36 are fixed at the corners of a relatively heavy gauge plate 52 upon which the head assembly 34 is mounted. The plate 52 may be further stiffened with elongate stiffeners 53. It will be seen that the plate 52 together with the head assembly 34 will move up and down by virtue of the operation of the lift assembly 32.

A plurality of spaced, vertical head posts 54 are stationarily mounted at their tops to plate 52. The head posts 54 extend vertically downward from the plate 52 and their bottoms are fixed to a compression assembly, generally 56.

The compression assembly 56 comprises a pair of spaced plates, an upper spacing plate 58 and a lower compression plate 60. The spacing plate 58 and compression plate 60 are spaced from each other by any suitable means, such as a wall 62 as shown in the drawings, and the spacing of the plates 58 and 60 relative to each other is preferably fixed and remains unchanged during operation. The bottom ends of the head posts 54 are fixedly attached to spacing plate 58 so that the spacing plate and hence the compression assembly 56 will move up and down in conjunction with the vertical movement of the head posts 54, the plate 52, the lift posts 36 and the lift assembly 32 generally.

Figure 2A:
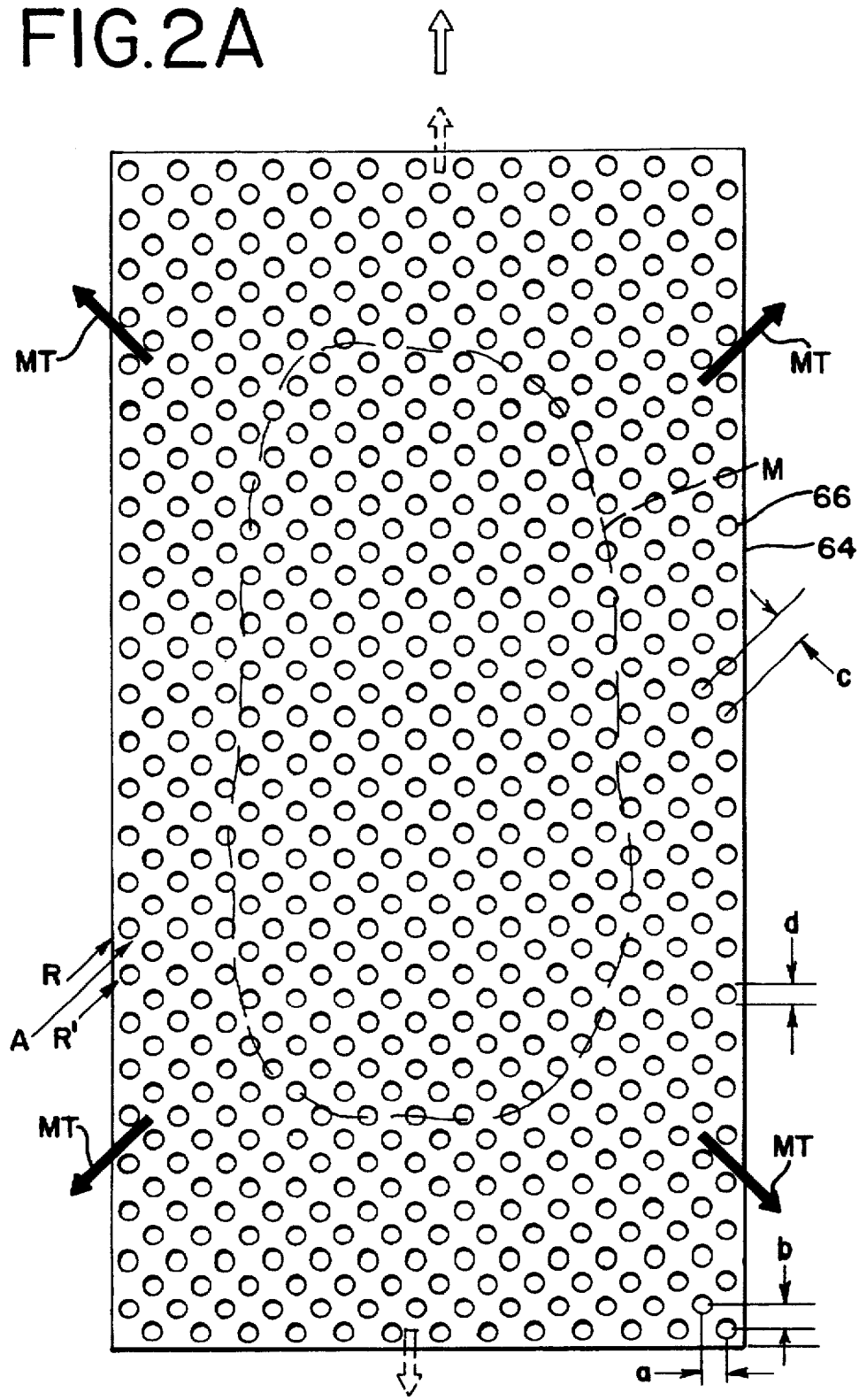
FIG. 2A is a schematic plan view of the pin plate of the assembly shown in FIGS. 1 and 2 and showing a preferred embodiment of pin arrangement and flow direction of desinewed muscle tissue which has been separated from the sinew in accordance with the present invention.

The head assembly 34 also includes a pin plate 64 above the compression assembly 56. A plurality of elongate pins 66 are fixed at their tops to the pin plate 64 and so as to extend vertically downwardly through apertures 68 in the spacing plate 58, and also through apertures 70 in the compression plate 60. The pins 66 are preferably arranged in columns and/or rows and the pins 66 of each column and/or row are preferably staggered from each other as shown in FIG. 2A to also form diagonal rows as shown. This will be discussed in more detail below. Accordingly, the pins 66 will be spaced from each other in the directions a, b and c as generally shown in FIG. 2A. It will be seen from FIGS. 2-7, that the pins 66 also preferably have blunt ends and are slidably movable through the apertures 68 and 70 and through the plates 58 and 60 as the pin plate 64 and press assembly 56 are moved relative to each other. The pin plate 64 is mounted for operation by a suitable coupling 72, preferably capable of at least some degree of pivotal motion, to the piston rod 74 of a power cylinder 76. The power cylinder 76 is preferably a pneumatic cylinder to preclude the possibility of undesirable leakage of hydraulic fluid which might result in contamination of the food products being processed. The air cylinder 76, in turn, is mounted on the plate 52 for up and down movement therewith by the lift assembly 32.

The assembly embodiment shown in FIGS. 1 and 2 also preferably includes some form of positioning and delivery equipment for delivering the meat M which is to be desinewed to the input end of the conveyor 16 and to position it so that it is properly aligned with the desinewing unit 30. This may comprise for example a hopper 78, as shown in FIGS. 1 and 2, into which the meat M to be processed may be deposited so as to fall upon the conveyor 18 as shown in FIG. 2, in a proper position to be received by the desinewing unit 30 upon indexing of the conveyor belt 18. When the meat M is processed according to the invention to separate its desirable muscle tissue MT from the sinew, the muscle tissue MT continues to be indexed along the assembly, also as shown by the hollow arrows in FIGS. 1 and 2, for discharge and further formulation into the final consumer product. Guidance of this muscle tissue MT may be facilitated by way of siderails 80 as shown in FIGS. 1 and 2.

Prior to discussing any further details of any of the remaining components of the assembly embodiment shown in FIGS. 1 and 2, a description of the operation of the assembly and method as shown in FIGS. 1-7 and as thus far described to separate the muscle tissue and sinew from the meat M will follow next to facilitate a clearer understanding of the invention.

The meat from which the sinew and/or fat which is associated with and attached to the sinew is to be removed is first deboned and cut into manageable sized pieces. These pieces are preferably further hand trimmed to remove any large visually distinct and accessible collections of fat, gristle and the like. These pieces are also preferably cleaned of any connective tissue membrane which might be present because the membrane, like the sinew, harbors generally undesirable fat cells associated with it. The connective tissue membrane may be removed using conventional membrane skinning equipment, such as a Maja or Townsend membrane skinner.

These boneless trimmed pieces or cuts of whole muscle meat M which are now to be processed in accordance with the invention are introduced to the input end of the conveyor belt 18 and properly positioned thereon by deposit through the hopper 78. The hopper 78 is preferably stationarily mounted relative to the input end of the conveyor belt 18 so that the meat M which is to be processed is properly positioned relative to the desinewing unit 30 as each piece is introduced to the assembly and method of the invention.

The conveyor belt 18 is then indexed by a suitable control (not shown) as well known to those skilled in the art to progressively move the meat M which has been deposited on the conveyor belt 18 and from which the sinew is to be removed in the direction of the hollow arrows shown in FIGS. 1, 2 and 2A and from beneath the hopper 78 in progressive indexed steps until it is beneath the desinewing unit 30. The location and size of the hopper 78 are selected relative to the length of each indexing step so that once the meat M from which the sinew is to be removed reaches the desinewing unit 30, it is properly positioned both longitudinally and transversely directly beneath the press assembly 56 and pin plate 64 and its pins 66, as shown in FIG. 2.

Figure 3:
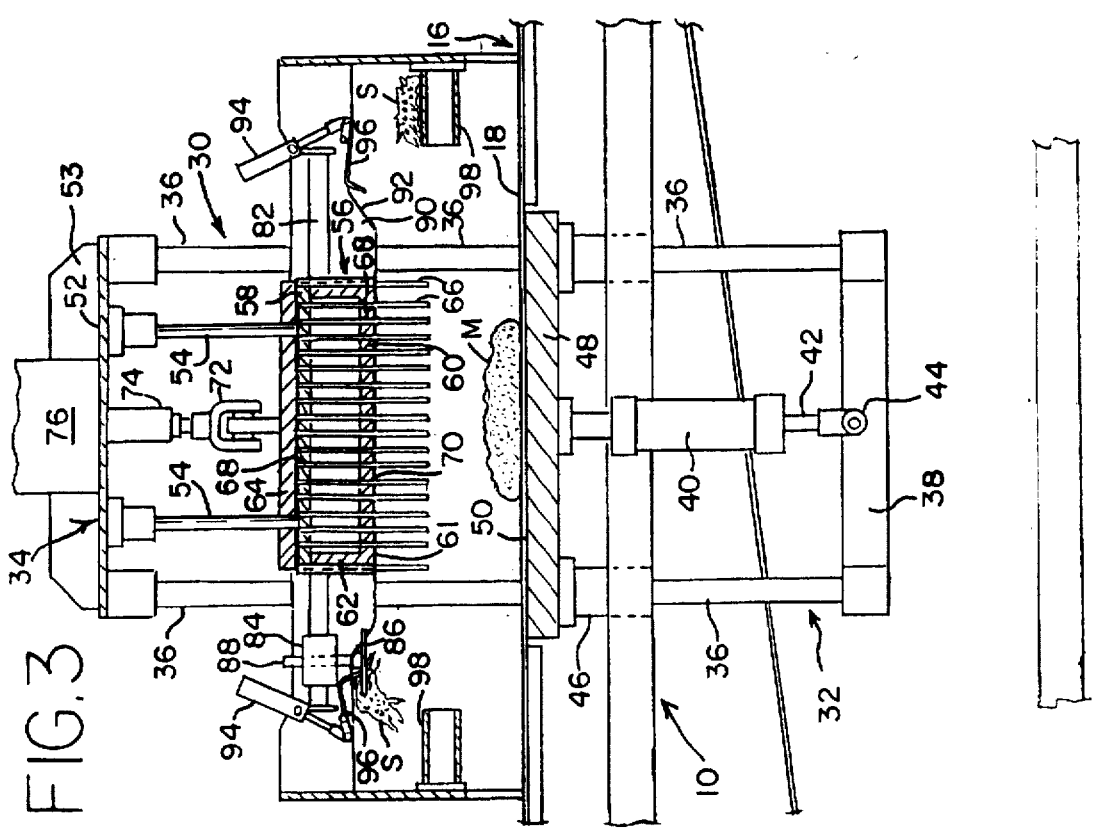

At this time the cylinder 76 of the head assembly 34 is actuated so that its piston rod 74 will extend and move the pin plate 64 from the position shown in FIG. 2 to the position shown in FIG. 3. As shown in FIG. 3, the pin plate 64 will move downwardly along head posts 54 until it rests upon the upper side of the spacing plate 58 of the compression assembly 56. As the pin plate 64 moves downwardly, its pins 66 will move from their retracted position as viewed in FIG. 2 to the position, as viewed in FIG. 3, in which their bottom ends extend from the surface 61 of the compression plate 60.

The force applied to the pin plate 64 by the air cylinder 76 should at least be of sufficient magnitude to be adequate in the embodiment of invention shown in FIGS. 1-7 for the pins 66 to stationarily restrain the sinew during desinewing as will be described below. By way of example it has been found that a force of about 3000–4000 pounds is adequate for this purpose where the pin plate has about 650 pins 66 which are about ¼ inch in diameter, i.e. about 32 in$^2$ of pins. If the number of pins and/or diameter is reduced, the force may be reduced, and conversely, if the number of pins and/or their diameter is increased the force should be generally increased in order to be of sufficient magnitude to insure that the sinew is stationarily restrained during the desinewing operation. The maximum amount of force is not critical and can be of any magnitude so long as it is sufficient to restrain the sinew against movement relative to the top surface of the belt 18 which is supported on the surface 50 of the base plate 48 and the compression surface 61 of the compression plate 60 as will be discussed below. Excessive forces are not preferred, however, because they are wasteful of energy and require heavier duty parts without achieving any appreciable further desirable result.

After the pin plate 64 has moved downwardly into contact with the upper surface of the spacing plate 58 as shown in FIG. 3, the air pressure is continued to be maintained in the cylinder 76 at least during the next two subsequent steps.

Figure 4:
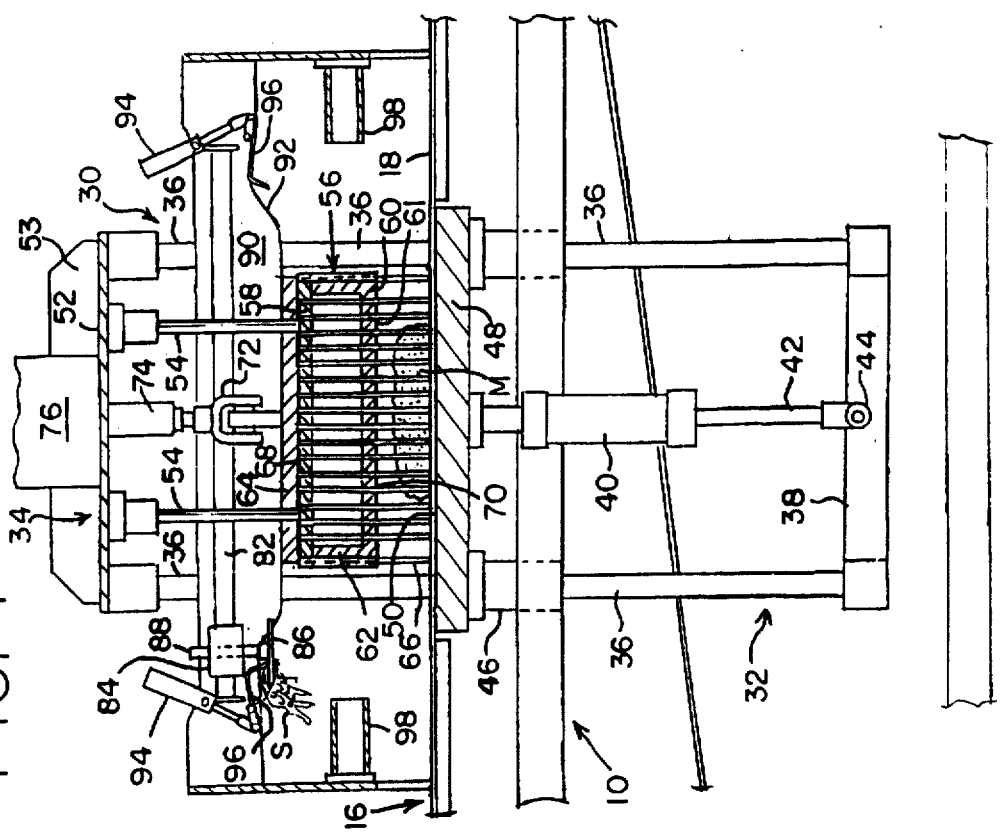

With particular reference now to FIG. 4, the lift assembly 32 is now actuated by supplying fluid pressure to the cylinder 40. This will cause the piston rod 42 of cylinder 40 to extend to move the frame 38 downward. As the frame 38 moves downward, it will move the lift posts 36 downward together with the plate 52 at the top of the lift posts. Movement of the plate 52 downward will also cause the head assembly 34 to also move downwardly with the cylinder 76 which is mounted to the plate 52 and the head posts 54 which also are firmly mounted to the plate 52. As the head posts 54 move downward, the compression assembly 56, the pin plate 64 which already rests on the compression assembly, and the pins 66 will also move downwardly until the blunt ends of the pins pierce or skewer the meat M and come to rest forcefully bearing against the top side of the conveyor belt 18 which in turn is supported by the upper surface 50 of the base plate 48, all as shown in FIG. 4.

With particular reference now to FIG. 5, the lift assembly 32 will continue to move downward. However, at this point the pins 66 have come to rest against the top surface of the conveyor belt 18 and, therefore, the pin plate 64 and the pins 66 will be restrained from further downward movement and will stop. The compression assembly 56, however, will continue to move downward and away from the pin plate 64 because the downward force exerted by the cylinder 40 is substantially greater than the force exerted by the cylinder 76 on the pin plate 64 and pins 66 as previously discussed. By way of example, it has been found that a force of about 5000–10000 pounds where the compression surface 61 is about 10 by 15 inches, i.e. about 150 in$^2$, is adequate to compress the muscle tissue sufficiently to remove it from and move it away and at a sharp angle from the sinew S which is restrained against movement relative to the conveyor 18, the surface 50 of the base plate 48 and the compression surface 61 as in the present invention. Again this force may be reduced somewhat if the compression surface 61 is reduced in size, and increased if the surface 61 is increased in size. And again, the maximum force is not critical, except that excessive forces which produce no additional benefit are not preferred as being wasteful and necessitating excessively heavy duty parts.

The compression assembly 56 will continue to move downwardly until it assumes its most downward position shown in FIG. 5. In this position the compression surface 61 of the compression plate 60 will exert a substantial compression force upon the meat as previously mentioned and which is sufficient to separate the muscle tissue from the sinew and force the tissue away from the restrained sinew, while a somewhat lesser force continues to be independently exerted on the pins 66 by the cylinder 76, but which lesser force is sufficient to restrain the sinew in the meat from sidewise movement and against movement relative to the conveyor 18, the surface 50 of the base plate 48 and the compression surface 61. The muscle tissue in the meat M which is separated from the sinew will exude outwardly toward the sides of the pin plate 66 through the spaces between the pins 66, as shown by the solid arrows in FIG. 2A, and transversely from beneath the compression assembly 56 and its compression plate 60 as best seen in FIG. 1.

Once the muscle tissue MT has been separated from the sinew which has been stationarily restrained by the pins 66, and has been exuded from beneath the compression plate 60, the assembly is indexed to its next cycle. As shown in FIGS. 1 and 6, when this indexing is initiated, cylinders 40 and 76 are reversed. Reversal of cylinder 40 will result in the raising of the lift assembly 32 as shown in FIG. 6, and the piston rod 42, frame 38, lift posts 36 and plate 52. Because the cylinder 76, head posts 54 and press assembly 56 are also mounted to the plate 52, they will also rise away from the conveyor belt 18 together with pin plate 64 and pins 66. As the compression surface 61 rises, the web of sinew S which was previously restrained and which has now been separated from the meat will firmly adhere to the surface 61 and will rise with that surface as shown in FIG. 6. The movement of the pin plate 64 relative to the compression assembly 56 and away from the conveyor belt 18 is preferably somewhat delayed while the compression assembly is being raised to cause the ends of the pins 61 to at least initially project somewhat beneath the surface 61 during this rising withdrawal. This will sufficiently reduce any tenacious adhesion of the web of sinew S to the rising surface 61 so that it may later be more easily removed as will be described to follow.

Once the desinewing unit 30 has been fully raised and withdrawn to the position shown in FIG. 7, the pin plate 64 will also be fully raised so that the blunt ends of the pins 66 will have moved into the compression plate 60 at least to the extent that they are flush with the surface 61. This will permit the web of sinew S to be easily scraped from the surface 61 as will be further described below.

Either while the desinewing unit 30 is in the process of retraction and raising as viewed in FIG. 6 or once it has become fully raised and retracted as viewed in FIG. 7, the conveyor belt 18 is indexed to move the just separated whole muscle tissue MT forward and toward the right end of the conveyor as viewed in FIGS. 1, 6 and 7, and to initiate movement of a new batch of meat M to be desinewed to a position beneath the press assembly 56, as progressively shown in FIGS. 6 and 7.

Referring still to FIGS. 1-7, one embodiment of subassembly is shown for the removal of the sinew S which has been removed from the muscle tissue, and which has adhered to the surface 61 after that surface has been raised and withdrawn to the position shown in FIG. 7.

In this sinew web removal subassembly embodiment, a pair of rodless cylinders 82 are mounted to extend horizontally and longitudinally of the conveyor belt 18 and within the lift posts 36, but straddling the press assembly 56. Each of the rodless cylinders 82 includes a movable carriage 84 which is movable axially along the length of the cylinder. The carriage 84 of each cylinder is magnetically coupled to the piston (not shown) within each of the rodless cylinders 82. A scraper 86 extends between and slightly beyond the carriages 84 and transversely across the conveyor belt 18. The scraper 86 is mounted to the respective carriages 84 by a spring loaded rod 88 which normally urges the scraper 86 upwardly as viewed in the drawings.

A pair of elongate, spaced parallel camming plates 90, each having a downwardly facing cam surface 92, also extend in a direction generally parallel to the rodless cylinders 82 and the direction of movement of the conveyor belt 18. These camming plates 90 also straddle the press assembly 56 and pin plate 64, as best seen in FIG. 1, but are positioned just outside of the rodless cylinders 82 and the cylinders 82 are mounted to them. During each cycle of operation of the desinewing unit 30 of the present invention, the scraper 86 is positioned out of action in a retracted position at one of the elevated ends of the cam surface 92, for example as shown in FIG. 5, until desinewing has been completed. When desinewing has been completed and the compression assembly 56, pin plate 64 and pins 66 have been raised and withdrawn and the blunt ends of the pins have been withdrawn to at least be flush with the surface 61 of the compression plate 60, all as shown in FIG. 7, the scraper 86 will be moved longitudinally from one end of the desinewing unit 30 to the other end, as shown by the arrow, along the cam surfaces 92 and beneath the surface 61 to scrape the web of sinew S which is stuck to the surface 61 from the surface and carry it to the other end of the cam surfaces 92 to be discarded.

The sinew web removal subassembly embodiment as shown in FIGS. 1-7 also includes a small, preferably pneumatically operated cylinder 94 adjacent each end of the rodless cylinder 82. Cylinder 94 operates a pivotally mounted sinew web removal scraping finger 96 for scraping and discharging a sinew web S from the scraper 86 which had been removed from the surface 61 of the press plate 60 in the last preceding processing cycle. The sinew web S which is removed from the scraper 86 is deposited by the fingers 96, as shown in FIG. 7, on web removal conveyors 98 which extend laterally above the conveyor belt 18 for removal of the sinew webs S from the assembly.

The sinew web removal and assembly, as thus far described and as shown in FIGS. 1-7, operates essentially as follows.

As previously described, substantial compression forces were applied to the meat M from which the sinew is to be removed between the top surface of the conveyor belt 18 as supported by the plate 48, and the compression surface 61 of the compression plate 60 while the sinew was restrained with the pins 66 in order to separate the muscle tissue from the restrained sinew. Once the muscle tissue MT has been separated, the lift assembly 32 will retract the press assembly 56, the pin plate 64 and the pins 66 by moving them upwardly as viewed in FIG. 6. During this retraction and upward movement, the blunt ends of the pins 66 are preferably permitted to continue to project somewhat beyond the compression surface 61 as shown in FIG. 6. As previously mentioned, this assists in the loosening of the web of sinew S which otherwise firmly and tenaciously adheres to the surface 61 of compression plate 60.

Once the compression assembly 56, pin plate 64 and pins 66 have been fully retracted, they will assume the position as viewed in FIG. 7. In this position the pins 66 will now at least be withdrawn to the point that their blunt ends are flush with the surface 61. This will permit the scraper 86 to travel the length of the surface 61 to scrape and remove the web of sinew S which is adhering to it.

Referring to FIGS. 6 and 7, in order to commence the removal of the sinew web S, the rodless cylinders 82 are actuated to move the carriages 84 from their left at rest position as viewed in FIG. 6 to the right. This will cause the scraper 86, which is upwardly spring loaded by the pin 88, to move downwardly from the position shown in FIG. 6 as the scraper moves to the right along the cam surface 92. The scraper 86 therefore will pass beneath the surface 61 of the press plate 60 to scrape and remove the web of sinew S as shown in FIG. 7. At the same time that the scraper 86 commences movement from its position as shown in FIG. 6, the cylinder 94 at that position will also be activated. When the cylinder 94 is actuated, it will rotate the scraping finger 96, as shown in FIG. 7, to scrape the web of sinew S which was on the scraper 86 from its previous scraping run, and flip it onto the conveyor 98 for removal laterally of the assembly as viewed in FIG. 1.

As the scraper 86 traverses the length of the surface 61, it will scrape and remove the web of sinew S from that surface and carry it to the right in the direction of the arrow as shown in FIG. 7 until the scraper 86 reaches the other end of its run. At that point, the carriages 84 and scraper 86 will stop with the just removed web of sinew hanging from the scraper. Thus, the scraper 86 with the just removed web of sinew is now positioned on the right in readiness for the web of sinew to be removed by the right hand scraping finger 96 during the next subsequent indexed processing step.

Although the sinew web removal subassembly has been depicted in FIGS. 1–7 as being relatively stationarily mounted relative to the up and down movement of the components of the desinewing unit 30, it will be appreciated that some or all of the components of the sinew web removal subassembly may be mounted for movement in conjunction with parts of the head assembly 34. For example, the rodless cylinders 82, scraper 86 and camming plates 90 may be mounted to and move up and down with either the press assembly 56 or the pin plate 64.

Referring to FIG. 8 a typical web of sinew S is depicted as just removed from the whole muscle tissue by the present invention. The sinew web S which adheres to the surface 61 as it is raised and scraped, as shown in FIGS. 6 and 7, is a wet and sticky stringy sheet which resembles to some extent a laced or crocheted appearance of interwoven or interlaced connective tissue T with holes H interspersed in the laced sheet. It will typically have a rather mottled white to pink to red coloration depending upon the amount of muscle tissue which has been separated from the sinew and the amount which remains with the sinew. The sinew web S will also typically contain a considerable number of fat cells which continue to adhere to the sinew upon separation of the muscle tissue from the sinew.

The diameter d, as shown in FIG. 2A, of the pins 66 may be about $\frac{1}{8}$–$\frac{1}{2}$ inch. The diameter is more preferably between about $\frac{7}{32}$–$\frac{1}{4}$ inch. It has been found that these diameters will provide the greatest level of sinew removal. With diameters smaller than this for the same pin spacing, the sinew tends to tear away and be less subject to restraint by the pins 66, and rather than being restrained, will tend to be transported with the muscle tissue rather than being separated from it.

Pin spacing is also important in the present invention. Where the pins are $\frac{1}{4}$ inch in diameter, the distance a, b, as seen in FIG. 2A, between the centers of the rows or columns is preferably about 0.30 inch and the distance c between the centers of the two most closely adjacent pins is preferably about 0.40 inch. Greater spacing will tend to result in less restraint of the sinew during the application of the compression forces which will result in a lower degree of removal of sinew (and its associated fat cells) from the muscle tissue. Conversely, closer spacing of the pins to each other will result in greater retention and separation of the sinew (and its associated fat cells) from the muscle tissue, but will also result in greater losses of muscle tissue which are retained with the sinew and a finer separation of muscle tissue from itself, although the muscle tissue is still whole muscle tissue which has not been ground or comminuted.

As shown in FIG. 2A, the pins 66 are arranged in a staggered relationship to each other to not only form rows and/or columns of pins at right angles to each other, but also form diagonal rows of pins R and R' with diagonally extending aisles A between the rows R and R'. The diagonal aisles A are defined by the spaces between respective pins in adjacent rows R and R', and because the aisles A are straight and uninterrupted, they will conduct the muscle tissue MT from the meat M toward the sides as shown by the solid arrows in FIG. 2A. From there the desirable muscle tissue MT can be conveyed away as previously described. With the diagonal arrangement as seen in FIG. 2A, the amount of desirable muscle tissue being discharged from the ends in the direction of the dotted arrows (and the hollow arrow in which the assembly is indexed) is minimized due to the obstructed tortuous path that the separated muscle tissue must take if it is to move in that direction. Although a staggered, generally diagonal pattern is shown and preferred for the reasons stated, other pin arrangements, such as rectangular or curvilinear positioning relative to each other, or in which areas are present in which pins have been omitted, e.g. cleared areas, are possible and might be preferred in certain circumstances.

A second embodiment of desinewing assembly and method is schematically shown in FIGS. 9–12. In this embodiment the desinewing unit 110 comprises a bottom compression plate 112, a top compression plate 114 and a pin plate 116. The pin plate 116 has a plurality of downwardly extending elongate pins 118 stationarily fixed to it and spaced from each other in a direction generally perpendicular to the longitudinal axes of the pins. The pins 118 slidingly extend through apertures 120 in the top compression plate and will enter and slide in the apertures 122 in the bottom compression plate 112. The ends of these pins 118 may either be blunt or pointed because they are not brought to bear with any significant force against a compression surface as are the pins 66 in FIGS. 1–7.

In the operation of this desinewing embodiment the cut of boneless trim of meat M from which the sinew is to be removed is positioned on the upper surface 124 of the bottom compression plate 112 as shown in FIG. 9. The pin plate 116 with its pins 118 is then lowered, as shown in FIG. 10 until its pins skewer the meat M, and enter and extend through the apertures 122 in the bottom compression plate 112, and the underside of the pin plate 116 moves into contact with the top of the top compression plate 114. Now movement of both the pin plate 116 and top compression plate 114 is continued until the meat M is compressed between the bottom surface of the top compression plate 114 and the upper surface 124 of the bottom compression plate 112. When this occurs, the sinew will be stationarily restrained against movement relative to the bottom surface of the top plate 114 and the upper surface 124 of the bottom plate 112 by the pins 118 which have skewered the sinew web. The compressive force on the muscle tissue will cause the muscle tissue MT to separate from the sinew as previously described, and be squeezed out transversely through the spaces between the pins 118 and from between the compression plates 112 and 114, as shown in FIG. 11.

When the muscle tissue MT has been separated from the sinew, the pin plate 116 and top compression plate 114 are moved upwardly away from the upper surface 124 of the bottom compression plate 112, as shown in FIG. 12. During such movement, the previously restrained web of sinew (not seen) will adhere as in the previous embodiment to the bottom surface of the top compression plate 114 and move upwardly in conjunction with it. Once the pins 118 have been fully retracted as shown in FIG. 12, the sinew can be removed by scraping or other suitable manner from the underside of the top compression plate 114.

A third embodiment of desinewing assembly and method is schematically shown in FIGS. 13–16. In this embodiment the desinewing unit 130 comprises a bottom compression plate 132, a top compression plate 134 and a pin plate 136. The pin plate 136 has a plurality of upwardly extending elongate pins 138 stationarily fixed to it and spaced from each other in a direction generally perpendicular to the longitudinal axes of the pins. The pins 138 slidingly extend upward through apertures 140 in the bottom compression plate 132, and will enter and slide in the apertures 142 in the top compression plate 134. The ends of these pins 138 also may either be blunt or pointed because they are not brought to bear with any significant force against a compression surface as are the pins 66 in FIGS. 1–7.

In the operation of this embodiment, the cut of boneless trim of meat M from which the sinew is to be removed is positioned on the exposed ends 144 of the pins 138 as shown in FIG. 13. The pin plate 136 with its pins 138 is then raised, as shown in FIG. 14, until the meat M is raised against the bottom surface 146 of the top compression plate 134, and the pins 138 skewer the meat M and extend through the apertures 142 in the top compression plate 134. The top of the pin plate 136 also moves into contact with the underside of the bottom compression plate 132. Upward movement of both the pin plate 136 and bottom compression plate 132 is now continued until the meat M is compressed between the bottom surface 146 of the top compression plate 134 and the upper surface 148 of the bottom compression plate 132. When this occurs, the sinew will be stationarily restrained against movement relative to the bottom surface 146 of the top plate 134 and the upper surface 148 of the bottom plate 132 by the pins 138 which have skewered the sinew. The compressive force on the muscle tissue will cause the muscle tissue MT to separate from the sinew as previously described, and be squeezed out transversely through the spaces between the pins and from between the plates 132 and 134, as shown in FIG. 15. When the muscle tissue MT has been separated from the sinew, the pin plate 136 and bottom compression plate 132 are moved downwardly away from the bottom surface 146 of the top compression plate 134, as shown in FIG. 16. During such movement, the previously restrained web of sinew will adhere, as in the previous embodiments, to the surface from which the pins 138 still extend, as shown in FIG. 16. However, in this embodiment that is to the top surface 148 of the bottom compression plate 132, and the sinew web (not seen) moves downwardly in conjunction with that surface. Once the pins 138 have been fully retracted, the sinew can be removed by scraping or other suitable manner from the top side 148 of the bottom compression plate 132.

It will be seen that the two embodiments of desinewing assemblies and methods shown in FIGS. 9–12 and 13–16 respectively differ from the first embodiment in at least one principal aspect. In the first embodiment shown in FIGS. 1–7, the ends of the pins 66 are brought to bear against the conveyor belt 18 which is supported by the upper surface 50 of the substantial base plate 48, and the pins do not penetrate these surfaces. Accordingly, a substantial force is exerted at the ends of these pins by the cylinder 76 when they bear against the conveyor belt 18 as shown in FIGS. 4 and 5. As previously discussed, this force may be on the order of 3000–4000 pounds to insure that the sinew is sufficiently stationarily restrained, and so that it does not move with the muscle tissue when the compressive force is applied to the meat in this embodiment.

However, in both the second and third embodiments shown in FIGS. 9–16, the pins do not stop and bear against the compression surfaces toward which they move during the desinewing operation. Instead, the pins move slidingly into and through those surfaces. In the embodiment shown in FIGS. 9–12, the pins 118 move into and through the apertures 122 in the bottom compression plate 112, and the pins are firmly restrained in those apertures against lateral movement when the compressive forces are exerted on the meat, as shown in FIG. 11, to separate the muscle tissue MT from the sinew. In the embodiment shown in FIGS. 13–16, the pins 138 move upwardly into and through the apertures 142 in the top compression plate 134, and the pins are firmly restrained in those apertures against lateral movement when the compressive forces are exerted on the meat, as shown in FIG. 15, to separate the muscle tissue MT from the sinew. Accordingly, in both of these latter embodiments, substantial vertical forces need not be applied to the pins in order to restrain the sinew, because the sinew is restrained simply by the rigid maintenance of the pin positioning due to their extension through rather than simply against their ultimate compression surfaces. The level of force that need be applied to those pins need only be sufficient for them to pierce or skewer the meat M to be desinewed and move into the plate apertures. The disadvantage, however, of these two embodiments is the need to accommodate the accurate alignment and registry of the pin ends into the apertures, and the difficulty in conveying and positioning of the meat M to be processed in the latter embodiments, and the removal of the separated muscle tissue and sinew from those embodiments.

Figure 17:
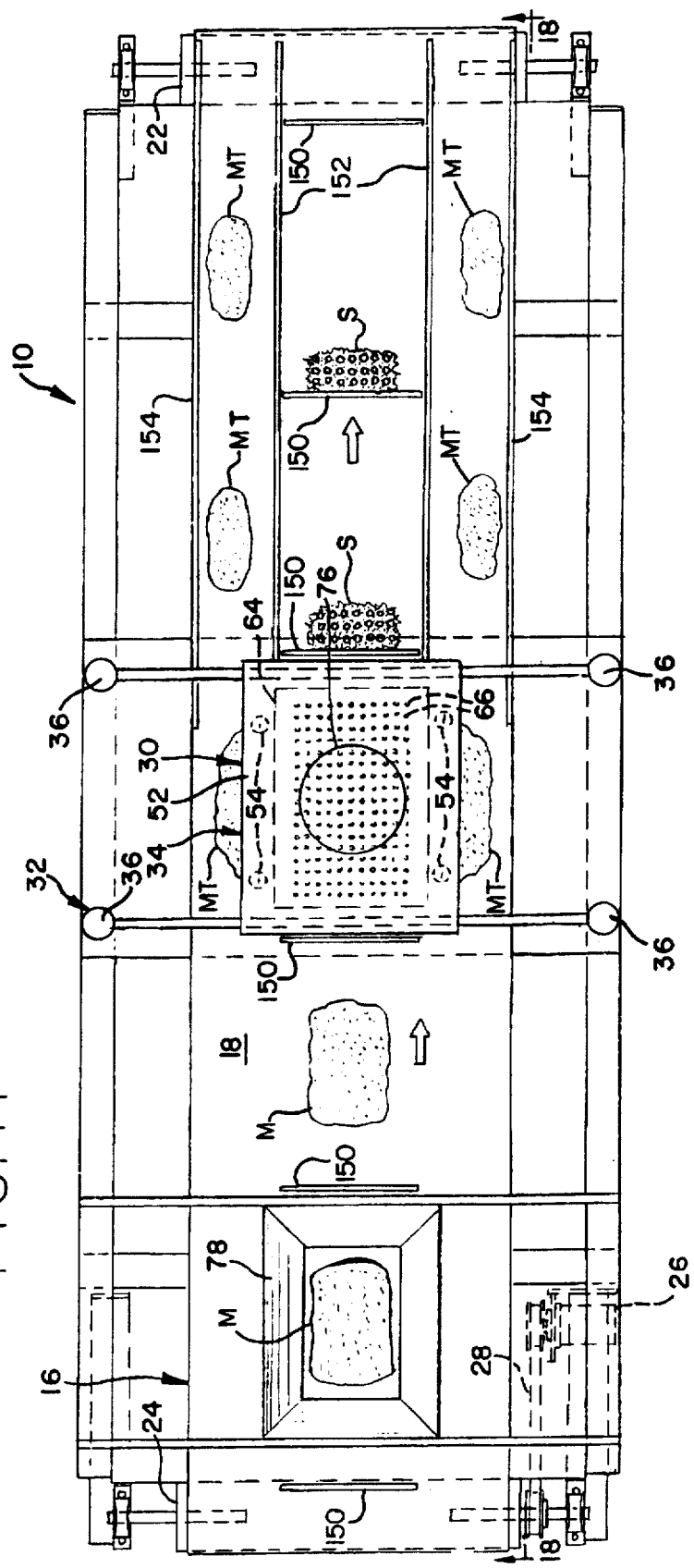
FIG. 17 is a plan view of the assembly for desinewing and for practicing the method of separation of sinew from the muscle tissue of meat substantially as shown in FIG. 1, but showing a second embodiment of subassembly for removal of the separated sinew web.
Figure 18:
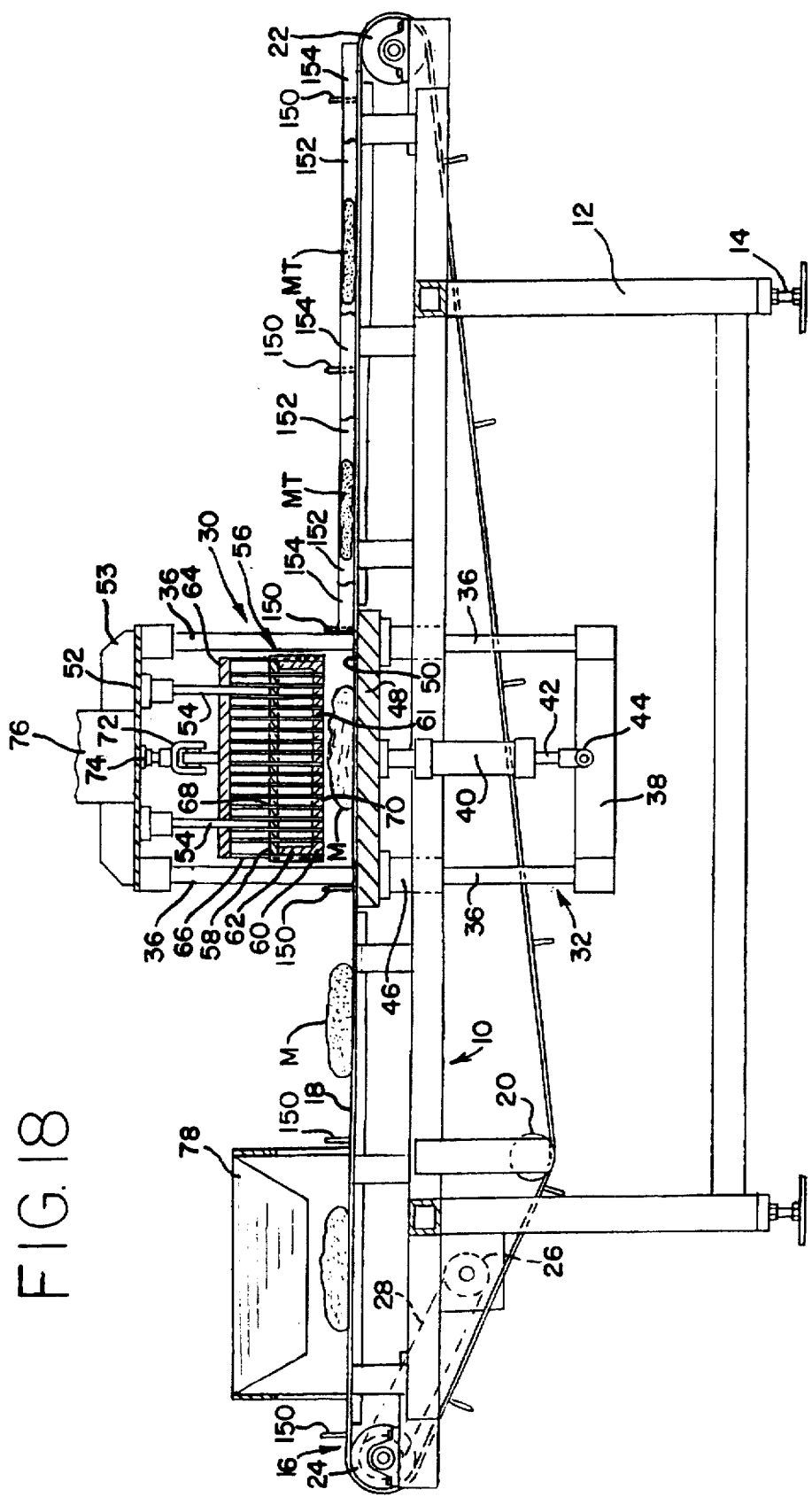
FIG. 18 is a partially broken, cross-sectioned side elevation view of the assembly substantially as shown in FIG. 17, and as viewed substantially along line 18—18 of FIG. 17.

In FIGS. 17 and 18 a second embodiment of assembly for the removal of sinew web after separation from the meat and from the desinewing unit 30 is shown. In this embodiment the rodless cylinders 82, scraper 86, camming plate 90, scraping fingers 96 and the web conveyors 98 which have been previously described and which are shown in FIGS. 1–7, can be eliminated. In this embodiment, the entire desinewing unit 30 is preferably located downwardly and closer to the conveyor belt 18 than as depicted in FIGS. 1–7 when the desinewing unit is in its fully upwardly retracted position as shown in FIG. 18. With a few other exceptions which will be discussed below, all of the other components of the desinewing assembly itself and as shown in FIGS. 1 and 2 are essentially identical to the components shown in FIGS. 17 and 18. Therefore, like reference numerals will be utilized to designate like components.

In the sinew web removal embodiment shown in FIGS. 17 and 18, a plurality of upstanding, relatively rigid but still flexible scrapers 150 are either fixedly mounted to or molded integral with the top surface of conveyor belt 18. The scrapers 150 are spaced from each other longitudinally of the belt by one indexed length, and they extend transversely across the belt for a length which is at least approximately equal to the transverse width of the press plate 60. The height of the scrapers 150 is also at least approximately equal to the distance between the upper surface of the conveyor belt 18 and the bottom compression surface 61 of the compression assembly 56, when the compression assembly is in its fully retracted position as seen in FIG. 18.

In this sinew removal subassembly embodiment, the siderails 80 as shown in FIGS. 1–7 have also been repositioned so that inner siderails 152 extend longitudinally along the conveyor belt 18 from the desinewing unit 30 toward the discharge end of the conveyor. The inner siderails 152 may taper outward slightly if desired. Outer siderails 154 may also be provided to thereby define a channel in combination with the inner siderails 152 on each side of the conveyor belt 18 to direct the muscle tissue MT which has been desinewed to the sides of the conveyor belt 18 for transport separately along the length of the remaining conveyor belt and discharge for use in the desired end product. The distance between the inner siderails 152 is sufficient to accommodate the passage of the scrapers 150 therebetween and the webs of sinew S which have been scraped off of the bottom compression surface 61 of the compression assembly 56 as best seen in FIG. 17, during each indexing of the assembly. These webs of sinew S are conveyed down the center of the conveyor belt 18, as shown by the hollow arrow in FIG. 17, and discharged separately from the muscle tissue MT at the same end of the conveyor belt 18.

It is preferred to form the components of the disclosed embodiments of desinewing assemblies which either directly or indirectly will come into contact with the meat or muscle tissue, or to otherwise coat these components with materials that are both food compatible and will endure the substantial forces to be exerted on them. For example, the pins 66 and compression surface 61 may be formed of stainless steel. Alternatively, the compression surface 61 may be coated with a suitable polymer such as Delrin.

EXAMPLES

The initial meat products identified below were processed according to the invention. In each case, the meat to be processed had its connective tissue membrane skinned, was then processed one pound at a time, and a total of 500 pounds was processed at a rate of 1440 pounds per hour. The force on the pins was about 3500 pounds and the force on the compression assembly was about 8000 pounds. The pins were cylindrical and ¼ inch diameter, were spaced apart 0.3 inch on centers and were 650 in number. The compression surface 61 of the compression plate 60 was 10 by 15 inches, i.e. 150 in$^2$. As processed, the product was 70 wt % lean muscle tissue and 30 wt % sinew web. The results were as follows:

| Initial Meat Product Processed | meat before processing | fat, wt % processed lean muscle tissue | processed sinew web |
|---|---|---|---|
| pork ham lower shank | 5.1 | 1.9 | 6.8 |
| pork front shank (7.3% fat initial after trimming and membrane skinning) | 2.5 | 1.5 | 3.5 |
| pork ham upper shank (3.0% fat initial after trimming and membrane skinning) | 2.0 | 1.07 | — |
| pork ham upper shank | 2.0 | 0.7 | 3.5 |
| whole turkey thighs | 5.6 | 2.5 | 5.9 |

In each of the above, the remainder of the lean muscle tissue after processing consisted of about 71–78 wt % moisture, 20–24% protein and about 1 wt % ash.

From the foregoing it will be appreciated that the present invention is capable of efficiently, effectively and economically separating desirable muscle tissue from sinew/fat. This will permit at a minimum an upgrading and improvement in the quality and value of meat cuts, which are already of good quality; will also make possible a substantial upgrading of lesser quality, less tender cuts of meat; and will further permit a substantial reduction in fat content by removal of the fat cells which are associated with and attached to such sinew. Indeed, it has been found that a significant and substantial portion of the sinew in a meat cut and fat reductions to as little as 1 wt % or less of the meat after processing according to the present invention may be accomplished with boneless, manually trimmed whole meat cuts, even where the meat is pork or ham. Significantly, all of this may be accomplished while producing an end product of whole muscle tissue and without grinding or comminuting the meat, without heating the meat or otherwise treating it in a manner which might result in denaturing or the loss of its freshness, and without the addition of diluents, additives or supplements.

It will also be understood that the preferred embodiments of the present invention which have been described are merely illustrative of the principles of the present invention. Numerous modifications may be made by those skilled in the art without departing from the true spirit and scope of the invention.

We claim:

1. A method of separating muscle tissue of meat from the sinew comprising:
   restraining the sinew against movement relative to a surface; and
   imparting a compressive force to the muscle tissue in a direction toward said surface while restraining the sinew, said force being sufficient to separate the muscle tissue from the sinew and cause the muscle tissue to move away from the restrained sinew in a direction at a substantial angle to the direction in which said compressive force is imparted to the muscle tissue.

2. The method of claim 1, wherein the sinew is restrained by piercing the meat from which the sinew is to be separated.

3. The method of claim 1, wherein the sinew is restrained by a plurality of elongate pins which are spaced from each other in a direction substantially perpendicular to the longitudinal axes of said pins.

4. The method of claim 3, wherein said pins pierce the meat from which the sinew is to be separated to restrain the sinew.

5. The method of claim 3, wherein the muscle tissue moves through the spaces between the pins and away from the restrained sinew.

6. The method of claim 1, wherein the meat from which the sinew is to be separated is positioned between a pair of surfaces, and the surfaces are brought together with the meat therebetween to impart the compressive force thereto to separate the muscle tissue from the sinew and cause the muscle tissue to move in a direction substantially parallel to at least one of said surfaces.

7. The method of claim 6, wherein said sinew is restrained against movement relative to at least one of said surfaces.

8. The method of claim 7, wherein said sinew is restrained by a plurality of elongate pins which are spaced from each other in a direction substantially perpendicular to the longitudinal axes of said pins, and which pins extend between said surfaces when restraining the sinew.

9. The method of claim 8, wherein said pins extend through at least one of said surfaces when the compressive force is imparted to the muscle tissue.

10. The method of claim 9, wherein said pins have blunt ends and the blunt ends pierce the meat and bear against one of the surfaces to restrain the sinew, and the other surface is moved along said pins and toward the blunt ends to impart said compressive force to the muscle tissue.

11. The method of claim 9, wherein a force is imparted to said pins which is of a magnitude sufficient to restrain the sinew.

12. The method of claim 11, wherein said compressive force is greater than said force which is imparted to said pins.

13. The method of claim 9, wherein said pins extend through both of said surfaces when the compressive force is imparted to the muscle tissue.

14. The method of claim 9, wherein the surface through which the pins extend when the compressive force was imparted to the muscle tissue is moved away from the other surface after the muscle tissue has moved away from the restrained sinew, and the restrained sinew moves with the surface through which the pins extended when the compressive force was imparted to the muscle tissue.

15. The method of claim 14, wherein the pins continue to extend through the surface while it is moving away from the other surface, and the sinew which has been removed moves away from the other surface with the surface that is moving away and through which the pins continue to extend.

16. The method of claim 8, wherein the muscle tissue moves through the spaces between the pins and away from the restrained sinew.

17. The method of claim 8, wherein the pins are arranged in a plurality of rows which are parallel to and spaced from each other to form elongate aisles in the spaces between the rows of pins, said aisles directing the flow of muscle tissue which has been separated from the sinew along their longitudinal axes.

18. The method of claim 17, wherein the rows and aisles extend generally diagonally to preferentially direct the flow of muscle tissue in their generally diagonal direction.

19. The method of claim 7, wherein the sinew is retained on one of said surfaces and is scraped from the surface on which it was retained after the muscle tissue has been separated from the sinew.

20. The method of claim 1, wherein said method also includes the removal of substantial amounts of fat associated with the sinew that is removed from the meat, said fat being restrained with the sinew with which it is associated while said compressive force is imparted to the muscle tissue to separate the muscle tissue from both the sinew and the fat associated with the sinew.

21. The method of claim 20, wherein the amount of fat in the muscle tissue is reduced to about 2 wt. % or less.

22. The method of claim 21, wherein the amount of fat in the muscle tissue is reduced to less than about 1–1½ wt %.

23. An assembly for separating sinew from the muscle tissue of meat comprising:

first and second surfaces spaced from each other to receive the meat therebetween from which the sinew is to be removed;

a plurality of elongate pins spaced from each other and movably extendable from said first surface toward said second surface to restrain the sinew, said pins also being movable through said first surface;

first drive means for imparting a force to said pins to move their ends toward said second surface for restraining the sinew in the meat from which the sinew is to be removed and which has been positioned between said surfaces; and second drive means for moving at least one of said surfaces toward the other to impart a substantial compressive force to the muscle tissue of the meat sufficient to cause the muscle tissue to separate from the sinew and move away from the sinew through the spaces between the pins while the sinew is restrained by the pins.

24. The assembly of claim 23, wherein said first drive means forces said ends of the pins into contact with said second surface to restrain the sinew from movement, and said second drive means moves said first surface toward said second surface to impart said compressive force to the muscle tissue while said pins are in contact with said second surface.

25. The assembly of claim 24, wherein said second surface includes a conveyor for moving the meat from which the sinew is to be removed to a location between the surfaces.

26. The assembly of claim 25, including means to remove the sinew which has been removed from the meat from one of said surfaces.

27. The assembly of claim 26, wherein said means to remove the sinew includes said conveyor which removes the sinew from said first surface.

28. The assembly of claim 24, wherein said ends of said pins are blunt.

29. The assembly of claim 23, wherein said pins pierce the meat from which the sinew is to be removed to restrain the sinew when said force is imparted to the pins.

30. The assembly of claim 23, wherein the meat from which the sinew is to be removed is positioned on said second surface, said pins and said first surface are moved downwardly toward said second surface, and sinew removal means is positioned to remove the sinew from which the muscle tissue has been removed from said first surface when said first surface has moved upwardly away from said second surface.

31. The assembly of claim 23, wherein the meat from which the sinew is to be removed is positioned on said ends of said pins, said pins and said first surface are moved upwardly toward said second surface, and sinew removal means is positioned to remove the sinew from which the muscle tissue has been removed from said first surface when said first surface has moved downwardly away from said second surface.

32. The assembly of claim 23, wherein said ends of said pins are blunt.

33. The assembly of claim 23, wherein said pins are movable through said first surface and said second surface.

34. The assembly of claim 23, wherein the diameter of said pins is about ¼ inch.

35. The assembly of claim 34, wherein the spacing between the centers of the most closely adjacent pins is about 0.40 inch.

36. The assembly of claim 23, wherein the spacing between the centers of the most closely adjacent pins is about 0.40 inch.

37. The assembly of claim 23, wherein said first drive means imparts a force to the most closely adjacent pins of a magnitude sufficient to restrain the sinew while said compressive force is being applied to the muscle tissue.

38. The assembly of claim 36, wherein said compressive force is greater than the force imparted by said first drive means.

39. The assembly of claim 23, wherein said pins are arranged in a plurality of rows which are parallel to and spaced from each other to form elongate aisles directing the flow of muscle tissue which has been separated from the sinew along the longitudinal axes of the aisles.

40. The assembly of claim 39, wherein the rows and aisles extend generally diagonally to preferentially direct the flow of muscle tissue in their direction.

* * * * *